INVENTOR
KASHMIRI L. GUPTA

BY Howard R. West Jr.
ATTORNEY

United States Patent Office 3,761,230
Patented Sept. 25, 1973

3,761,230
AUTOCLAVE PRESSURE CONTROL SYSTEM
Kashmiri L. Gupta, Kingston, Ontario, Canada, assignor to Du Pont of Canada Limited, Montreal, Quebec, Canada
Filed Mar. 11, 1971, Ser. No. 123,303
Claims priority, application Canada, Mar. 26, 1970, 78,586
Int. Cl. B01j 3/00
U.S. Cl. 23—290
2 Claims

ABSTRACT OF THE DISCLOSURE

A control system for the preparation of condensation polymers, such as polyhexamethylene adipamide, in a reactor chamber having a heating means and an exhaust vent, whereby a pressure measuring device measures the pressure in the reactor chamber. This pressure is compared against a predetermined pressure/time pattern and any difference in the pressure is adapted to control the heating means or the flow of exhaust gases from the exhaust vent so that the pressure in the reactor vessel follows the predetermined pattern.

BACKGROUND OF THE INVENTION

This invention relates to the production of condensation polymers and more specifically to a system for providing uniform boiling within an autoclave during polymerization and thereby improving product uniformity.

This invention is applicable to the preparation of condensation polymers such as polyamides and polyesters prepared by heating the reactants under pressure and venting volatile by-products of the reaction. It is particularly suitable for the preparation of polyamides as disclosed in and as prepared in U.S. Pat. No. 2,163,636.

There are generally at least five steps in the autoclave process. In the first step, the autoclave is heated by a suitable means, such as a vapor heat-transfer medium, to raise the temperature and pressure of the autoclave batch. The heat to the autoclave and the pressure in the autoclave are maintained in the second step for a selected period of time. Products of reaction such as water, in vapor or steam form, and other volatile by-products of polymerization, are removed from the autoclave batch during these two steps, until at the end of the second step the required polymer concentration is attained. Further steps in the autoclave process include pressure let down, where the pressure in the autoclave is gradually reduced; equilibration, where the reactants (hexamethylene diamine and adipic acid in the case of production of polyhexamethylene adipamide) are allowed to stay in contact with the products of reaction (polyhexamethylene adipamide and water) until no further reaction is possible under existing conditions or the rate of reaction approaches zero; and casting of the batch where the molten polymer is forced by steam or inert gas pressure to flow through a nozzle onto a casting machine in the form of a ribbon. Water is sprayed on the polymer ribbon so that it solidifies and may then be cut into small pieces known as "flake."

At least one of the problems in the preparation of condensation polymers arises from uneven heat transfer throughout the solution in the autoclave. If the heat transfer is not even, polymerization tends to begin spottily throughout the reaction solution, leading to poor uniformity of product. This poor uniformity shows up as a variation in dye receptivity in the end product.

During the past few years, the textile trade has made an increasing use of acid dyestuffs in the dyeing of nylon (polyhexamethylene adipamide). Since the acid dyes react with certain chemical groups (amine ends) in the nylon fiber, a variation in the chemical groups from fiber to fiber brings about a difference in the amount of dye accepted by each fiber. This manifests itself in the form of streaks if these different fibers are in the same fabric.

During the production of nylon in an autoclave, quantities of hexamethylene diamine are lost to the atmosphere along with the exhaust vapors and gases. The amount of hexamethylene diamine lost is referred to as diamine loss. It is this diamine loss, which is not consistent from batch-to-batch or autoclave-to-autoclave that causes the final product to be subject to variations in the number of amine ends (the dye receptive sites for acid dyestuffs) and carboxyl ends from batch-to-batch and autoclave-to-autoclave. In order to meet present day market demands, it is necessary to eliminate these variations through tighter control over the polymerization process.

One method of controlling the diamine loss has been disclosed in applicant's Canadian application No. 19,516 filed May 8, 1968 and now Canadian Pat. No. 849,719, issued Aug. 18, 1970 (U.S. application Ser. No. 768,228, filed Oct. 17, 1968 and now abandoned in favor of a continuation-in-part application filed Feb. 26, 1971, Ser. No. 119,360). In this previous case, the flow of the exhaust gases from a reactor chamber is controlled to a predetermined pattern. However, the majority of the exhaust gases are released from the reaction solution during the second step of the autoclave process when the solution is boiling.

When the heat is applied to the autoclave in the first step, it has been the regular practice to have the autoclave vent closed until the pressure reaches the selected level. When this selected level is reached, the first step is terminated, and the vent is opened for the commencement of the second step. On investigation, the solution in the autoclave at the end of the first step has a temperature gradient from top to bottom of the batch. Thus at the commencement of the second step, only the top portion of the batch is boiling. This implies that only a fraction of the overall mass in the autoclave has reached the boiling temperature, while the remainder of the mass is below the boiling temperature. This is known as partial boiling and results in increased concentration of the solution in the boiling zone relative to the solution in the non-boiling zone, thereby increasing the total amount of diamine lost. Furthermore, it has been found that this boiling portion can vary in size from batch-to-batch or from autoclave-to-autoclave, thus resulting in varying diamine loss.

It is an object of the present invention to provide a system for improving the uniformity of condensation polymers during polymerization.

It is a further object of this invention to provide a control system and a method to initiate uniform boiling during polymerization.

SUMMARY OF THE INVENTION

With these and other objects in view, there is provided an autoclave for the preparation of condensation polymers having a heating means and an exhaust vent, a control system for improving the uniformity of the polymer product comprising: a pressure measuring means adapted to measure pressure in the autoclave; a comparator adapted to compare the pressure against a predetermined pressure/time pattern; and a controller actuated by an error signal from the comparator indicating a difference between the pressure in the autoclave and the pattern, adapted to control the heating means and/or the flow of exhaust gases from the exhaust vent to vary the pressure in the autoclave to follow the pattern.

There is also provided the improvement of means for controlling the flow of exhaust gases escaping from the reaction zone and controlling the heat input to the reaction zone so that the pressure in the reaction zone increases in accordance wtih a predetermined pressure/time pattern.

DETAILED DESCRIPTION OF THE ILLUSTRATED EMBODIMENTS

Figure 1:
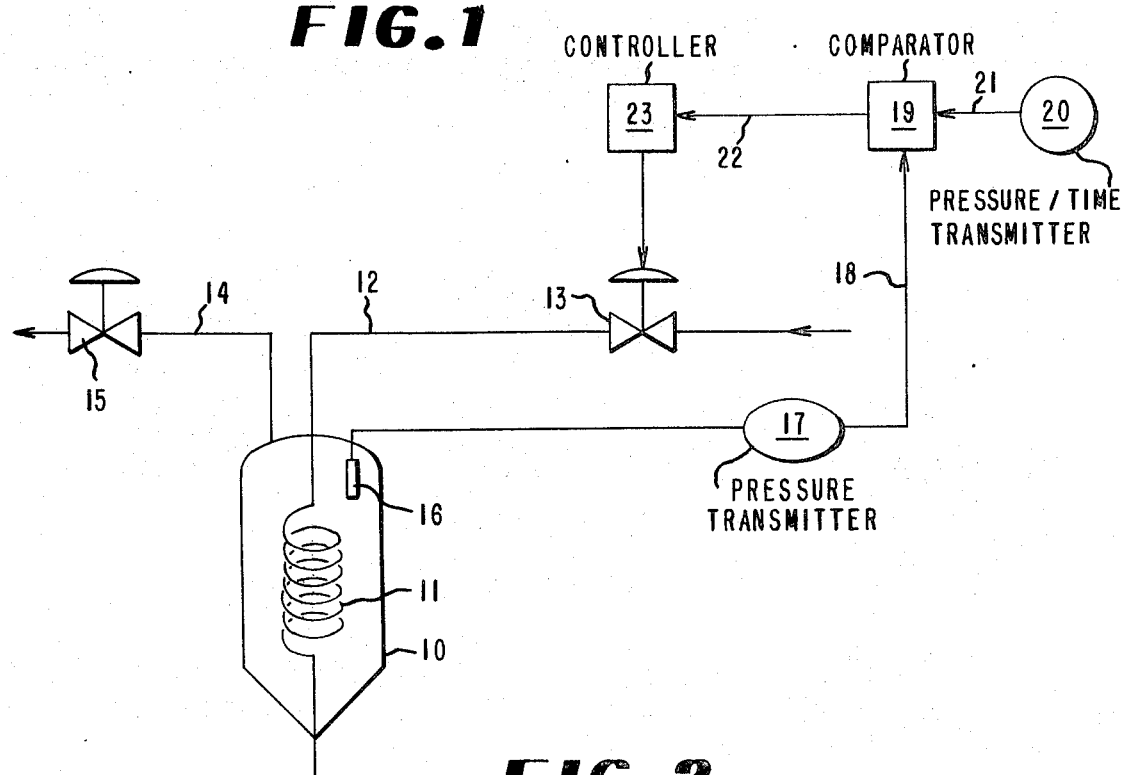
FIG. 1 is a schematic diagram showing the embodiment of the control system of this invention on an autoclave wherein the pressure is compared against a predetermined pressure/time pattern.

Referring now to FIG. 1, an autoclave 10 is shown having a heating coil 11 therein. A vapor heat supply line 12 to the heating coil 11 has the flow controlled by valve 13. An exhaust vent line 14 having a valve 15 is connected to the top of the autoclave 10. The pressure inside the autoclave 10 is perceived by a pressure measuring device 16. A pressure transmitter 17 connected to the pressure measuring device 16 feeds a first pressure signal 18 to a pressure comparator 19. A pressure/time transmitter 20 is programmed to have a predetermined pattern of the increase in pressure in the autoclave 10 for the first step of the process, i.e., a predetermined pressure pattern as a function of batch time. The pattern is derived from both theoretical calculations and results from actual process runs and is inscribed on the time pattern transmitter which may be a standard unit available in the instrumentation field. A second pressure signal 21 from the time pattern transmitter 20 is fed to the pressure comparator 19.

The comparator 19 compares the first pressure signal 18 with the second pressure signal 21 and produces an error pressure signal 22 which is fed to a heat input controller 23. The heat input controller 23 controls the opening of valve 13 in the vapor heat supply line 12.

In operation, the autoclave 10 is charged with the starting solution for polymerization. The valve 15 in the exhaust vent line is opened a predetermined amount to allow the exhaust gases to bleed to atmosphere while the pressure in the autoclave 10 is being programmed upwards. The valve 13 in the vapor heat supply line 12 is opened to allow the first step of the polymerization to commence. Dowtherm® has been found to be a satisfactory heat-transfer medium for the process. As the process commences, the pressure time transmitter 20 feeds a pressure signal 21 to the pressure comparator 19. The comparator 19 compares the pressure signal 21 with the pressure signal 18 from the pressure transmitter 17 and sends an error pressure signal 22 to the input controller 23 to control the opening position of the valve 13 in the vapor heat supply line 12. Thus, when the error pressure signal 22 is zero, the pressure in the autocalve 10 coincides with the pressure from the pressure/time transmitter and in this way the increasing pressure follows the pressure/time pattern.

In the embodiment shown in FIG. 1, the error pressure signal 22 from the pressure comparator 19 is fed to a heat input controller 23. It has been found that this system works adequately if the pressure error signal 22 is fed to an exhaust vent flow controller (not shown) to control the opening of the valve 15 in the exhaust vent line 14. In a system such as this, the opening of the valve 13 in the vapor heat supply line 12 would have to be at a predetermined setting. The pressure in the autoclave 10 would then be controlled by the exhaust vent flow rather than the heat input, but the increasing pressure would nevertheless follow the pattern.

Figure 2:
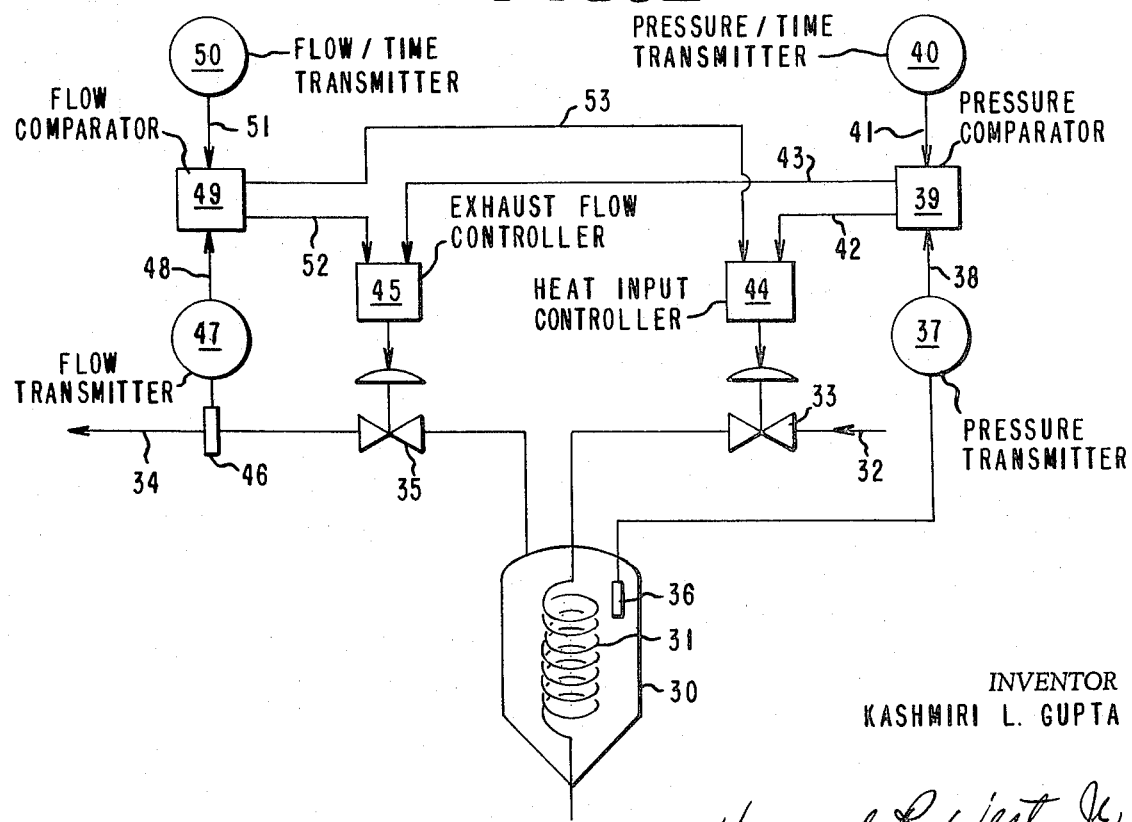
FIG. 2 is a schematic diagram showing a further embodiment of the control system wherein the pressure is compared against a predetermined pressure/time pattern and the exhaust vent flow is compared against a predetermined flow/time pattern.

In a further embodiment of the invention shown in FIG. 2, an autoclave 30 is shown having a heating coil 31 therein. A vapor heat supply line 32 feeds the heating coil 31 and has a valve 33 to control the flow. An exhaust vent line 34 having a valve 35 is connected to the top of the autoclave 30. A pressure measuring device 36 inside the autoclave 30 feeds by means of a pressure transmitter 37, a first pressure signal 38 to a pressure comparator 39. A pressure/time transmitter 40 feeds a second pressure signal 41 to the pressure comparator 39.

The pressure comparator 39 compares the first pressure signal 38 with the second pressure signal 41 and produces a first error pressure signal 42 and a second error pressure signal 43. These two error signals are the same. The first error pressure signal 42 is fed to a heat input controller 44 which controls the valve 33 in the vapor heat supply line 32. The second error pressure signal 43 is fed to an exhaust flow controller 45 which controls the valve 35 in the exhaust vent line 34.

A flow measuring device 46 is installed downstream of the valve 35 in the exhaust vent line 34. A flow transmitter 47 connected to the flow measuring device 46 feeds a first flow signal 48 to a flow comparator 49. A flow/time transmitter 50 feeds a second flow signal 51 to the flow comparator 49.

The flow comparator 49 compares the first flow signal 48 with the second flow signal 51 and produces a first error flow signals 52 and a second error flow signal 53. These two error signals are the same. The first error flow signal 52 is fed to the exhaust flow controller 45 and the summation of the first error flow signal 52 and the second error pressure signal 43 controls the opening of valve 35 in the exhaust vent line 34. The second error flow signal 53 is fed to the heat input controller 44 and the summation of the first error pressure signal 42 and the second error flow signal 53 controls the opening of the valve 33 in the vapor heat supply line.

The embodiment shown in FIG. 2 differs from that in FIG. 1 by the addition of an exhaust flow comparator which compares the exhaust vent flow against a predetermined pattern of exhaust vent flow. In FIG. 2 the heat input and exhaust flow are both controlled so that the increasing pressure follows the preset pattern of the pressure/time transmitter, and the exhaust flow follows the preset pattern of the flow/time transmitter.

It has been found that it is not always necessary to feed all the error signals shown in FIG. 2 to both heat input and exhaust flow controllers and adequate control can be maintained if some of the error signals are zero. If the second error pressure signal 43 is zero and second error flow signal 53 is zero, then the first error pressure signal 42 is used to control the heat input and the first error flow signal 52 is used to control the exhaust flow. If the first error pressure signal 42 is zero and the first error flow signal 52 is zero, then the second error pressure signal 43 is used to control the exhaust flow and the second error flow signal 53 is used to control the heat input.

The second error pressure signal 43 may be zero; the heat input is then controlled by the summation of the first error pressure signal 42 and the second error flow signal 53 and the exhaust flow is controlled by only the first error flow signal 52. Alternatively, the first error flow signal 52 may be zero; the heat input is then controlled by the summation of the first error pressure signal 42 and the second error flow signal 53 and the exhaust flow is controlled by only the second error pressure signal 43.

In the preparation of polyhexamethylene adipamide, it has been found that the pressure is allowed to build up to approximately 250 lbs./sq. in. before moving to the second step of the process. By controlling this pressure buildup by the means herein described, the time for the first step increases by a small amount over the time for the first step when the vent control valve 15 is closed, however, more agitation occurs in the solution in the autoclave and at the end of the first step over 60% of the solution has reached the boiling point, as against only about 30% when the vent control valve 15 remains closed.

EXAMPLE

The control configuration of FIG. 2 was used in controlling an autoclave for the preparation of polyhexamethylene adipamide. In the first step, in which the batch was heated to raise the temperature and pressure, the first error pressure signal 42 and the first error flow signal 52 were both zero. Thus, the second error pressure signal 43 which emanated from the pressure comparator 39, comparing the autoclave pressure with a preset pressure/time pattern, was used to control the exhaust flow and the second error flow signal 53 which emanated from the flow comparator 49, comparing the vent rate with a preset flow/time pattern, was used to control the heat input to the autoclave.

Before the second step, in which the heat to the autoclave and the pressure in the autoclave were maintained, the controls were changed and the second error pressure signal 43 and the second error flow signal 53 both became zero. The vent rate was controlled from the vent valve 35 according to a preset flow/time pattern and the pressure in the autoclave was controlled from the heat input according to a preset pressure/time pattern.

Both pressure and flow time patterns were developed through trial and error procedure such that the pressure of the heating medium, which in this case was Dowtherm®, stayed between approximately 15 to 30% below the maximum available Dowtherm® pressure. For the first step of the process, the vent flow was maintained at a constant value by keeping the vent valve at approximately 7% open while the process pressure in the autoclave was allowed to rise from 60 p.s.i.g. to 250 p.s.i.g. For the second step of the process, the pressure in the autoclave was maintained at a constant value of approximately 250 p.s.i.g. while the vent rate was allowed to vary such that the Dowtherm® pressure stayed 15 to 30% below te maximum available pressure. The development of both pressure and flow time patterns required approximately three batches before the Dowtherm® pressure limits were attained.

A digital computer is used to implement control configurations determined as above for the preparation of 2650 lb. batches of a fiber-forming polyhexamethylene adipamide from the diammonium salt of hexamethylene diamine and adipic acid added under pressure to an autoclave as an 82% by weight solution in water at 152° C. At the beginning of the first step, the computer produces signals representing the pressure/time and flow/time patterns and ensures that the first error pressure signal 42 and the first error flow signal 52 are both zero (Mode A). When the process pressure in the autoclave reaches approximately 70 p.s.i.g. the signals are changed and the second error pressure signal 43 and second error flow signal 53 become zero (Mode B). This form of control is maintained for approximately 50 minutes, until the end of the second step at which time the signals are switched back to the first form of control. The combination of these two forms provides excellent control during the first two cycles of the batch polymerization which consist of a first cycle of limited venting as the temperature rises resulting in a gradual pressure rise to 264.6 p.s.i.a. whereupon the second cycle begins with increased venting and continued heating at a constant pressure of 264.6 p.s.i.a. Following this, a third cycle is begun when the polymer temperature reaches 236° C. involving a gradual reduction of pressure to atmospheric over a period of 65 minutes using normal autoclave control to finish the polymer, followed by extrusion of the still molten polymer, quenching and cutting into flake.

Samples of polymers prepared in this way are analyzed for amine end-group concentrations and the statistical Variance (Sigma)$^2$ therefor is compared to polymer batches prepared in the regular way without the control system of the invention. Results in Table I show the test flake from batch-to-batch to be significantly more uniform than regular flake.

TABLE I (Sigma)$^2$ test _____ 0.17
(Sigma)$^2$ regular _____ 0.248

A uniform boiling throughout the batch is noticed from the beginning of the second step and this results in uniform polymerization throughout the batch. In previous operations, when the exhaust vent valve was kept closed throughout the first step, at the beginning of the second step a temperature differential of from about 20 to 30° C. occurred from top to bottom of the batch. This gave rise to non-uniformity in diamine loss from one batch to the next.

The predetermined pressure and vent rate patterns versus time for the first and second cycles are shown in Table II. The difference between the patterned set-points and that actually achieved is typically shown in Table III including the regions where Mode A and Mode B control are used.

TABLE II.—FIRST AND SECOND CYCLE PATTERNS

| Time (min.) | Pressure (p.s.i.a.) | Vent patterns (percent of max. flow) |
|---|---|---|
| 0 | 67.0 | 7.0 |
| 2.75 | 87.0 | 7.5 |
| 5.5 | 107.0 | 8.0 |
| 8.25 | 127.0 | 8.5 |
| 11.0 | 150.0 | 9.0 |
| 13.7 | 177.0 | 9.5 |
| 16.5 | 207.0 | 10.0 |
| 19.25 | 240.0 | 14.0 |
| 22.0 | 264.6 | 40.0 |
| 23.96 | 264.6 | 69.5 |
| 25.92 | 264.6 | 76.6 |
| 27.88 | 264.6 | 76.2 |
| 29.84 | 264.6 | 75.9 |
| 31.80 | 264.6 | 74.8 |
| 33.76 | 264.6 | 73.8 |
| 35.72 | 264.6 | 71.4 |
| 37.68 | 264.6 | 69.2 |
| 39.64 | 264.6 | 65.8 |
| 41.60 | 264.6 | 61.8 |
| 43.56 | 264.6 | 57.8 |
| 45.52 | 264.6 | 52.7 |
| 47.48 | 264.6 | 47.6 |
| 49.44 | 264.6 | 41.0 |
| 51.5 | 264.6 | 36.8 |
| 53.46 | 264.6 | 32.3 |

TABLE III

| Time, min. | Δvent rate,$^1$ percent | Δpressure,$^1$ p.s.i. |
|---|---|---|
| *First cycle (Mode A)* | | |
| 1.0 | +6.0 | −6.0 |
| 1.5 | −6.6 | −5.2 |
| 2.0 | −6.7 | −0.8 |
| 2.5 | −6.9 | +0.6 |
| 3.0 | −3.4 | +1.1 |
| 3.5 | −6.0 | +0.6 |
| 4.0 | −5.8 | −0.4 |
| 4.5 | −4.6 | −0.2 |
| 5.0 | −3.5 | −0.6 |
| 5.5 | −3.8 | −0.1 |
| 6.0 | −2.0 | −0.3 |
| 6.5 | −0.3 | −0.4 |
| 7.0 | −0.05 | −0.4 |
| 7.5 | −0.1 | +0.1 |
| 8.0 | −0.23 | +0.5 |
| *Mode B begins* | | |
| 8.5 | +0.91 | +0.2 |
| 9.0 | +0.01 | +0.7 |
| 9.5 | +0.09 | +0.1 |
| 10.0 | +0.15 | −2.0 |
| 10.5 | −0.20 | −3.0 |
| 11.0 | +0.26 | −4.3 |
| 11.5 | +0.08 | −4.8 |
| 12.0 | −0.35 | −5.0 |
| 12.5 | +0.21 | −6.1 |
| 13.0 | −0.17 | −5.0 |
| 13.5 | +0.28 | −2.7 |
| 14.0 | +0.44 | −1.7 |
| 14.5 | +0.01 | +2.1 |
| 15.0 | +0.03 | +1.6 |
| 15.5 | +0.04 | −1.0 |
| 16.0 | +0.07 | +0.2 |
| 16.5 | +0.35 | −0.5 |
| 17.0 | −0.35 | +0.2 |

TABLE III—Continued

| Time, min. | Δ vent rate,[1] percent | Δ pressure,[1] p.s.i. |
|---|---|---|
| 17.5 | −0.09 | |
| 18.0 | | −0.4 |
| 18.5 | −0.10 | |
| 19.0 | | −0.5 |
| 19.5 | +0.13 | |
| 20.0 | | −0.3 |
| 20.5 | −1.1 | |
| 20.7 | | −0.5 |
| 21.0 | | −0.5 |
| 21.2 | −0.9 | |
| 21.5 | −1.1 | |
| 21.6 | | −0.1 |
| 22.0 | −1.1 | |

Second cycle

| | | |
|---|---|---|
| 0.2 | | +1.2 |
| 0.5 | | +1.1 |
| 0.7 | −1.5 | |
| 1.0 | −1.2 | |
| 1.2 | | −0.8 |
| 1.5 | | −0.8 |
| 1.6 | −1.5 | |
| 2.0 | | −0.8 |
| 2.2 | −0.8 | |
| 2.5 | −0.41 | −0.4 |
| 3.0 | −0.2 | −0.4 |
| 3.5 | −0.4 | −0.5 |
| 4.0 | −0.2 | −0.4 |
| 4.5 | −0.45 | −0.4 |
| 5.0 | −0.04 | −0.3 |
| 6.0 | −0.05 | −0.5 |
| 7.0 | −0.09 | −0.4 |
| 8.0 | −0.02 | −0.1 |
| 10.5 | −0.11 | −0.2 |
| 11.0 | −0.05 | −0.8 |
| 12.0 | −0.08 | −0.4 |
| 13.0 | −0.13 | −0.5 |
| 14.5 | +0.13 | −0.5 |
| 19.0 | +0.10 | −0.3 |
| 20.0 | +0.05 | −0.2 |
| 21.0 | +0.04 | −0.2 |
| 22.0 | +0.02 | −0.2 |
| 23.0 | +0.10 | −0.2 |
| 27.0 | +0.32 | −0.4 |
| 28.0 | +0.14 | −0.4 |
| 29.0 | +0.26 | −0.3 |

Mode A again

| | | |
|---|---|---|
| 30.0 | 0.7 | −0.9 |
| 31.0 | −0.5 | −0.4 |

[1] Δ parameter refers to difference between the set point and the actual value.

I claim:

1. In an autoclave for the preparation of condensation polymers having a heating means and an exhaust vent, a control system for improving the uniformity of the polymer product comprising: a pressure measuring means for measuring pressure in the autoclave; a comparator for comparing the pressure against a predetermined pressure/time pattern and generating an error signal; a flow measuring means for measuring the flow of exhaust gases through the exhaust vent; a flow comparator for comparing the flow of exhaust gases against a predetermined flow/time pattern; a first controller being actuated by at least one error signal each from the pressure comparator and the flow comparator for controlling the heating means; and a second controller actuated by at least one error signal each from the pressure comparator and the flow comparator for controlling the flow of exhaust gases through the exhaust vent to vary the pressure in the autoclave to follow the pattern.

2. In an autoclave for the preparation of fiber-forming condensation-polymers having a heating means and an exhaust vent, a control system for improving the temperature gradient from top to bottom of the reaction solution within the autoclave comprising: a pressure measuring device adapted to produce a first signal representing the pressure in the autoclave; a pressure/time pattern transmitter for producing a second signal representing a predetermined pressure/time pattern; a pressure comparator for comparing the first and second pressure signals and producing an error pressure signal proportional to the difference between the first and second pressure signals; a flow measuring device for producing a first flow signal representing the flow of exhaust gases through the exhaust vent; a flow/time pattern transmitter for producing a second flow signal representing a predetermined flow/time pattern; a flow comparator for comparing the first and second flow signals adapted to produce an error flow signal proportional to the difference between the first and second flow signals; a first controller actuated by the error flow signal and error pressure signal adapted to control the heating means; and a second controller actuated by the error flow signal and error pressure signal adapted to control the flow of exhaust gases through the exhaust vent to vary the pressure in the autoclave to follow the pattern.

References Cited

UNITED STATES PATENTS

| | | | |
|---|---|---|---|
| 2,325,067 | 7/1943 | Marks | 23—290 |
| 2,808,316 | 10/1957 | Hall | 23—252 R |
| 3,006,736 | 10/1961 | Green | 23—253 R |
| 2,863,737 | 12/1958 | Green | 23—263 |

JAMES H. TAYMAN, Jr., Primary Examiner

U.S. Cl. X.R.

23—253 A, 252 R; 165—39; 260—95 A, 78 R, 685, 698; 236—26 B